(12) United States Patent
Mitchell

(10) Patent No.: US 6,434,896 B1
(45) Date of Patent: Aug. 20, 2002

(54) DOUBLE-WALLED UNDERGROUND TORNADO SHELTER WITH CONNECTION MEANS ON THE FLANGES OF UPPER AND LOWER HEMISPHERICAL HALVES

(75) Inventor: R. Brent Mitchell, Danville, AL (US)

(73) Assignee: Applied Solar Technology, Inc., Danville, AL (US)

( * ) Notice: Subject to any disclaimer, the term of this patent is extended or adjusted under 35 U.S.C. 154(b) by 0 days.

(21) Appl. No.: 09/589,487

(22) Filed: Jun. 7, 2000

(51) Int. Cl.[7] .............................................. E02D 27/00
(52) U.S. Cl. ...................................... 52/169.6; 52/80.2
(58) Field of Search ................................ 52/169.6, 166, 52/309.16, 309.2, 81.6, 80.1, 81.4, 788.1, 589.1, 80.2

(56) References Cited

U.S. PATENT DOCUMENTS

| | | | |
|---|---|---|---|
| 487,727 A | * 12/1892 | Erath | ........................ 52/786.1 |
| 795,984 A | 8/1905 | Julian | |
| 2,968,130 A | * 1/1961 | Bascom | ....................... 52/206 |
| 3,049,835 A | 8/1962 | Sundstrum | |
| 3,159,117 A | 12/1964 | Rosenfeld | |
| 3,212,220 A | 10/1965 | Boniecki et al. | |
| 3,974,599 A | 8/1976 | Grosh | |
| 3,999,337 A | * 12/1976 | Tomassetti et al. | ........ 52/169.6 |
| 4,126,972 A | * 11/1978 | Silen | .............................. 52/34 |
| 4,539,780 A | 9/1985 | Rice | |
| 4,642,952 A | 2/1987 | Prandin | |
| 4,660,334 A | * 4/1987 | McCarthy | ................... 52/169.6 |
| 4,955,166 A | * 9/1990 | Qualline et al. | ........... 52/169.6 |
| 5,628,154 A | * 5/1997 | Gavette | ....................... 52/81.4 |

OTHER PUBLICATIONS

"Rotational Molding–The Basic Process", Association of Rotational Molders, 1995.*
*Rotational Molding–The Introductory Guide to Designing Rotationally Molded Plastic Parts*; Association of Rotational Molders; 1982, 1990.

* cited by examiner

Primary Examiner—Beth A. Stephan
Assistant Examiner—Naoko Slack
(74) Attorney, Agent, or Firm—King & Spalding

(57) ABSTRACT

An underground tornado shelter having a double-hull design is constructed through a rotational molding process from any one of a variety of materials, such as linear medium-density polyethylene. The tornado shelter has a dome-shaped upper half and a hemispherical lower half. Each half includes a flange, an inner wall, and an outer wall. The outer wall may include planar wall portions, indentation portions, and rib portions. The tornado shelter can also have an anchoring system that is integral with the lower half of the shelter and is formed through the same rotational molding process used to shape the rest of the lower half. Pipes can be inserted into the pipe alignment grooves in the anchoring system, and secured in place with plates bolted to the anchoring system across pipe alignment grooves.

34 Claims, 14 Drawing Sheets

DOUBLE-WALLED UNDERGROUND TORNADO SHELTER WITH CONNECTION MEANS ON THE FLANGES OF UPPER AND LOWER HEMISPHERICAL HALVES

FIELD OF THE INVENTION

The invention relates generally to prefabricated housing and, more particularly, relates to underground tornado shelters.

BACKGROUND OF THE INVENTION

Tornadoes are among the most devastating of natural phenomena. A single tornado can destroy houses and neighborhoods. Because tornadoes are difficult to predict, tornadoes can strike with little notice to the people threatened by them.

Scientists know that some geographic areas are prone to have tornadoes. Accordingly, people who live in those areas should take precautions to protect their lives in the event of a tornado. Specifically, someone who lives in an area prone to tornadoes can install an underground tornado shelter that enables the person to survive a tornado that destroys the person's home.

Underground tornado shelters are known in the art. Typically, tornado shelters are constructed from concrete, steel, or fiberglass. Fiberglass tornado shelters have been popular in recent years because they offer many advantages over concrete or steel tornado shelters.

To make a conventional fiberglass tornado shelter, a manufacturer typically constructs a dome-shaped mold for the upper half of the tornado shelter and a hemispherical mold for the lower half of the tornado shelter. A worker then sprays layers of fiberglass material onto the molds. When the fiberglass hardens, the worker removes the upper half and the lower half from the molds. The upper half and the lower half of the tornado shelter each have a single wall of fiberglass forming the structure. The worker then attaches the upper half of the tornado shelter to the lower half of the tornado shelter using bolts. The manufacturer may then transport the tornado shelter to the customer.

To install the tornado shelter, workers excavate the earth to form a hole. They then place the tornado shelter into the hole. There are many different ways to anchor the tornado shelter in the hole. In one example, the workers insert pipes into cylindrical receptacles in the bottom of the lower half of the shelter. The pipes extend beyond the bottom of the lower half of the shelter. Once the workers have placed the shelter in the ground, they put concrete slabs over the portions of pipe extending beyond the bottom of the lower half of the shelter. These concrete slabs anchor the tornado shelter inside the ground. Other systems known in the art are also useful for anchoring the tornado shelter in the ground. The workers then bury the tornado shelter with dirt, leaving only an entrance to the tornado shelter exposed to the surface.

Although fiberglass tornado shelters are currently the industry standard, construction of tornado shelters from fiberglass has several disadvantages. For example, the molding process is slow, so production capacity is limited. Furthermore, molding a tornado shelter from fiberglass in the described manner requires a skilled operator. Because skilled operators command relatively high wages, the molding process using fiberglass is relatively expensive. Also, the thickness of the fiberglass walls greatly affects the cost and structural integrity of the shelter. Because the thickness of the fiberglass walls is difficult to control, the quality of the finished product varies according to the skillfulness of the operator. Furthermore, fiberglass is brittle, so tornado shelters constructed of fiberglass are sometimes damaged during transport to the installation location.

Due to the nature of the molding process using fiberglass, only the surface of the fiberglass wall that was in contact with the mold is smooth. The side of the wall opposite the side contacting the mold is rough, resulting in an unappealing finish.

Additionally, the nature of the molding process using fiberglass does not easily allow the creation of bolt holes on the upper half of the shelter that match corresponding bolt holes on the lower half. Thus, attaching the upper half of a tornado shelter made from fiberglass to the lower half is difficult. Furthermore, the completed tornado shelter is often not leak-proof because bolts are an imperfect method for joining the upper and lower halves together. Although a gasket material may be used to improve the seal between the upper half and the lower half, the gasket material may fail and is difficult to repair. As a result of the disadvantages inherent in a fiberglass tornado shelter built as described, there is a need in the art for an improved tornado shelter and an improved method for manufacturing a tornado shelter.

SUMMARY OF THE INVENTION

The present invention meets the needs described above in an improved tornado shelter constructed through a rotational molding process from any moldable material, such as high-density polypropylene or linear medium-density polyethylene. These materials are more durable and impact resistant than fiberglass. Accordingly, a tornado shelter constructed of such material is less likely to be damaged during transport to the installation location than a tornado shelter constructed of fiberglass.

By using rotational molding to construct the tornado shelter, numerous other advantages are realized. For example, the quality of the finished product is less dependent on the skill of the worker manufacturing the components of the shelter. Accordingly, the manufacturer of the shelter saves expenses because the manufacturer can more easily train workers to produce high quality tornado shelters. Furthermore, the manufacturer's production capacity is increased because producing a tornado shelter through rotational molding is quicker than producing a tornado shelter using fiberglass.

According to one aspect of the invention, the rotational molding process is used to create an improved tornado shelter having a double-hull design. In other words, both the upper half and the lower half of the tornado shelter have an inner wall of linear medium-density polyethylene, an outer wall of polyethylene, and an optional layer of insulation between the inner and outer walls. Although linear medium-density polyethylene is used in a preferred embodiment, those skilled in the art will appreciate that other moldable materials such as polypropylene could also be used. This double-hull design offers numerous advantages over a conventional fiberglass tornado shelter having only a single layer of fiberglass. For example, the visible interior and exterior surfaces of the tornado shelter are smooth. This creates a more appealing and finished appearance than can be achieved with conventional single-hull fiberglass tornado shelters. Additionally, the layer of insulation provides structural support for the improved tornado shelter. Also, the insulation layer helps to prevent condensation from forming on the interior walls of the improved tornado shelter, which is a frequent problem with conventional single-hull fiberglass tornado shelters.

Through the rotational molding process, more exact design specifications can be met, allowing the manufacturer to realize additional advantages. For instance, the two halves of the improved tornado shelter can be manufactured with flanges around the periphery of their external surfaces. The flange on the upper half of the shelter is constructed to mate with the flange on the lower half of the shelter. This allows the person building the improved shelter to more easily align the halves and fasten them together. Also, due to the nature of the rotational molding process, the manufacturer can accurately control the amount of polyethylene or other material used to construct the shelter. Thus, the present invention enables the manufacturer of the improved tornado shelter to ensure that the thickness of the inner and outer walls of the tornado shelter match design specifications.

According to another aspect of the invention, the upper half of the tornado shelter is attached to the lower half by placing a bonding material (e.g., linear medium-density polyethylene or high-density polypropylene) embedded with wire between the flanges located on each of the halves of the shelter. An example of such a bonding material embedded with wire is POWERCORE. When electrical current is run through the wire, the bonding material melts. By allowing the bonding material to solidify while in contact with both flanges, a tight seal is created between the two halves of the improved tornado shelter. The bonding material embedded with wire may be applied in concentric rings. Applying the bonding material embedded with wire in concentric rings is also referred to as applying the material in multiple runs.

The tight seal created in this manner is generally superior to the seal created by connecting the two halves of a fiberglass tornado shelter using bolts. Furthermore, if a leak does occur in the improved tornado shelter, it is easier to fix. To fix such a leak, one simply melts the bonding material by again running current through the embedded wire and then allows the bonding material to solidify.

Generally described, the improved tornado shelter comprises a dome-shaped upper half having a first flange and a hemispherical lower half having a second flange with a shape mirroring the first flange. The upper half and the lower half each include an inner wall shaped through a rotational molding process and an outer wall shaped through the same rotational molding process. This combination of an inner and an outer wall is known as a "double-hull" design. Each half of the tornado shelter may also have a layer of insulation that is created during the rotational molding process and which is located between the inner wall and the outer wall.

The tornado shelter also has a means for forming a tight seal between the first flange and the second flange. For example, through-bolts or clamps could be used to hold the two flanges tightly together, and using a gasket either between the flanges or outside the flanges achieves a tight seal. Alternatively, the seal between the two flanges may be the result of welding the flanges together or using a chemical bonding agent between them.

Alternatively, as described above, a bonding material embedded with wire may also form the tight seal between the two flanges. An example of such a material is POWER-CORE. The bonding material may be a plastic, such as highdensity polypropylene or linear medium-density polyethylene. To fuse the two halves of the shelter together, the bonding material embedded with wire is placed in solid form between the first flange and the second flange. When electrical current is run through the wire, the bonding material melts. Upon solidification, the bonding material bonds to both the first flange and the second flange, thereby fusing the two halves of the tornado shelter together.

The two halves of the tornado shelter may have additional features. For example, the upper half may be molded to define an opening through which a person can enter the tornado shelter. The lower half may have steps that enable someone to walk down into the shelter. The lower half may also have a circular seat on the floor inside the lower half. Both halves may be molded to include a pattern of ribs and indentations that reinforces the tornado shelter.

Additionally, the improved tornado shelter may have an anchoring system. Typically, the anchoring system is integral with the lower half of the shelter and is formed through the same rotational molding process used to shape the rest of the lower half.

In one embodiment, the anchoring system may have several pipe alignment grooves. A completed tornado shelter may also have pipes and plates used to help anchor the tornado shelter. The pipes lie in the pipe alignment grooves. Each plate connects edges of one of the pipe alignment grooves. For each plate, there is a means for fastening that plate to the anchoring system, thereby ensuring that the plates secure the pipes in their respective pipe alignment grooves. The pipes may each have two ends extending beyond the anchoring system.

Alternatively, the anchoring system may have several cylindrical spaces defined by the molding on the bottom of the tornado shelter. The pipes then lie in the cylindrical spaces such that the two ends of the pipes extend beyond the anchoring system.

In both anchoring systems, a slab of material (such as concrete) is placed on top of the portions of the pipes extending beyond the anchoring system. When the tornado shelter is buried, the surface areas of these slabs prevents the tornado shelter from rising in the ground. Because weight is not a crucial factor, the slabs may alternatively comprise the same material used to mold the rest of the tornado shelter or another moldable material. In fact, the slabs themselves may be molded using a rotational molding process. These slabs may have grooves that help the slabs to rest more securely on the pipes.

Through a means for aligning the upper half of the tornado shelter with the lower half, the tornado shelter may provide for easy assembly. Specifically, the means for aligning the two halves may include several boss and socket arrangements on opposing flanges. When the bosses slide into the socket receptacles, the two halves of the shelter are properly aligned. In another embodiment, the two halves of the shelter may each have corresponding sockets connected by pins.

Another means for aligning the upper half of the tornado shelter with the lower half involves placing bolts through corresponding holes on opposing flanges of the shelter. To increase the alignment range, two alternative types of holes are especially useful: 1) oversized holes that are larger than the bolts, or 2) inverted, conical holes, where the wide ends of the conical holes face each other. The conical-type holes (wide ends facing each other) can more easily accommodate the draft requirements of the molding processes.

In another embodiment, the present invention provides a process for making an underground tornado shelter. To make the tornado shelter, a manufacturer rotationally molds a dome-shaped upper half and a hemispherical lower half. The material used in the rotational molding process may be linear medium-density polyethylene or any other moldable material. The upper half includes a first flange and a first double-hull having a first inner wall, a first outer wall, and optionally a first layer of insulation between the first inner wall and the first outer wall. The lower half includes a second flange, a second double-hull, and an anchoring system having several pipe alignment grooves. The second double-hull has a second inner wall, a second outer wall, and optionally a second layer of insulation between the second inner wall and the second outer wall. After rotationally molding the two halves of the shelter, the manufacturer forms a tight seal between the first flange and the second flange.

In order to install the shelter, the manufacturer places pipes with two ends extending beyond the anchoring system into the pipe alignment grooves. Then, the manufacturer secures the pipes in the grooves by fastening to the anchoring system plates that connect edges of the pipe alignment grooves.

To finish installing the shelter, workers excavate the earth to define a hole in which they can bury the tornado shelter. After placing the tornado shelter in the hole defined by the excavated earth, they place slabs on the ends of the pipes to anchor the tornado shelter in the hole. They then bury the tornado shelter, perhaps with dirt, in a manner that exposes to the surface an entrance to the shelter.

The various aspects of the present invention may be more clearly understood and appreciated from a review of the following detailed description of the disclosed embodiments and by reference to the appended drawings and claims.

DETAILED DESCRIPTION OF EXEMPLARY EMBODIMENTS

The present invention is typically embodied in an underground tornado shelter constructed through a rotational molding process. The tornado shelter is constructed from any of a variety of materials, including linear medium-density polyethylene, high-density polypropylene, or any other moldable material. Linear medium-density polyethylene is used in a preferred embodiment.

As rotational molding is well known to those skilled in the art, the details of the rotational molding process are not described in this specification. Nonetheless, a brief and general description of rotational molding follows. Rotational molding is a plastics processing technique that is suited to producing relatively large, hollow, seamless parts which are partially or totally enclosed. The rotational molding process begins with the design and construction of a hollow mold. A worker then deposits a pre-measured amount of plastic material inside the mold and seals the mold.

Subsequently, the mold is heated in order to melt the plastic material. As the mold is heated, a machine rotates the mold continuously about its vertical and horizontal axes. This biaxial rotation brings all surfaces of the mold into contact with the melted plastic material. The machine continues to rotate the mold as the mold is cooled. Typically, this process creates a uniform layer of material against the inner walls of the mold. After the mold has cooled, the worker opens the mold and removes the product.

As will be described shortly, the rotational molding process simplifies the manufacture of the exemplary tornado shelters that will be described. Turning now to the figures, in which like numerals refer to like elements throughout the several figures, typical embodiments of the present invention will be described.

Features of an Exemplary Tornado Shelter

Figure 1:
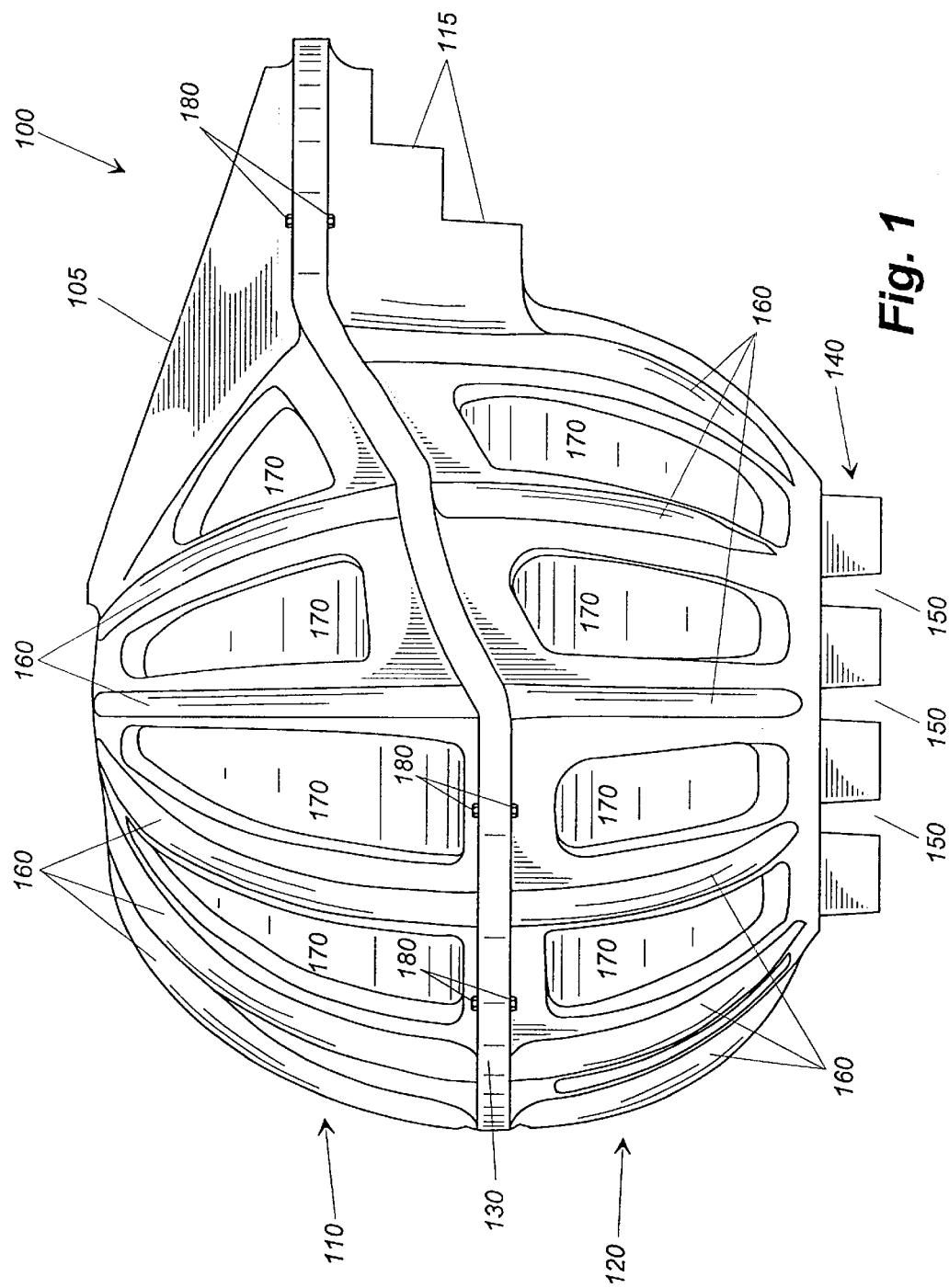
FIG. 1 is a side view of an assembled tornado shelter in accordance with an exemplary embodiment of the present invention.
Figure 2:
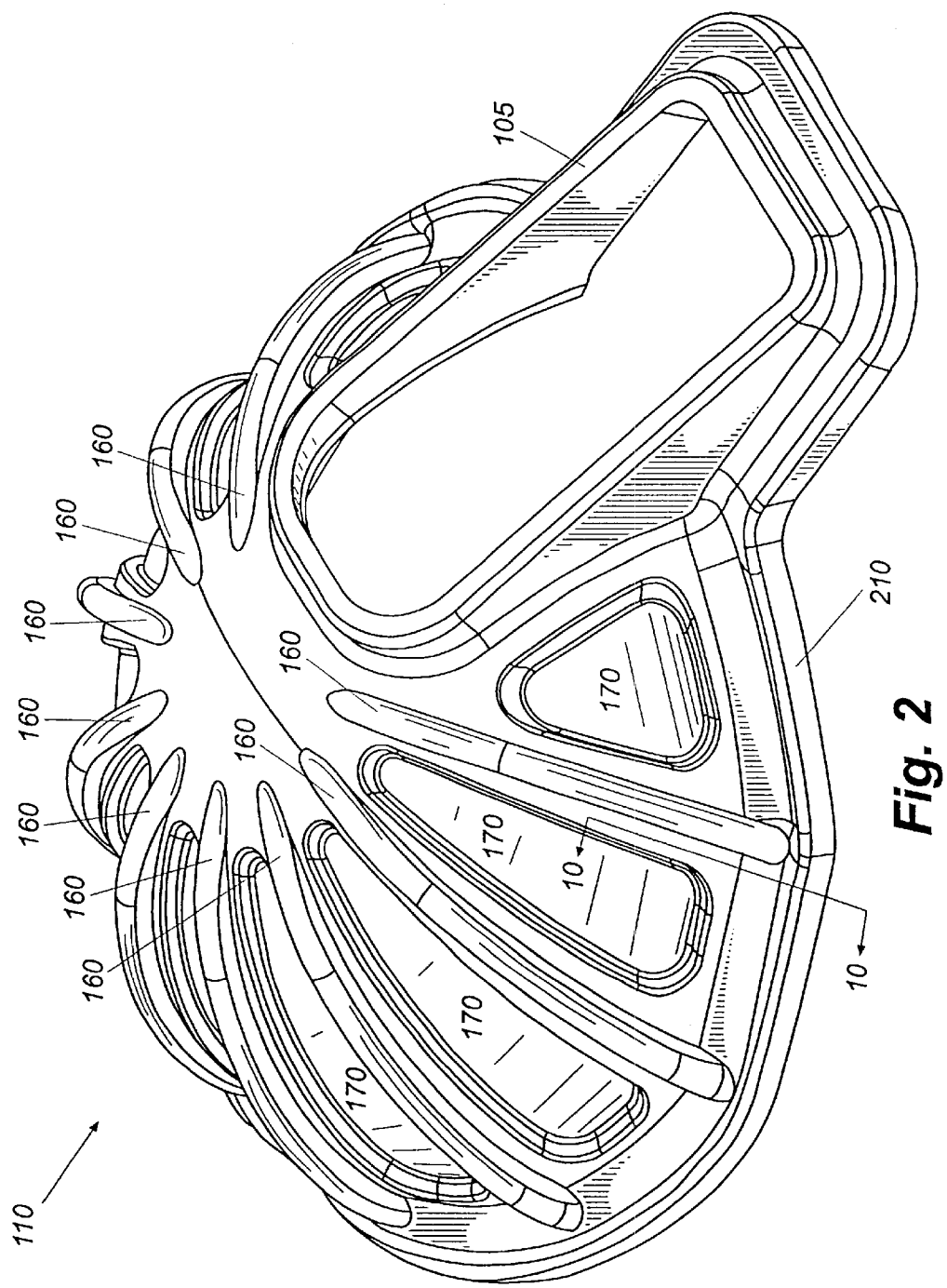
FIG. 2 is a perspective view of the outer wall of the dome-shaped upper half of a tornado shelter in accordance with an exemplary embodiment of the present invention.
Figure 3:
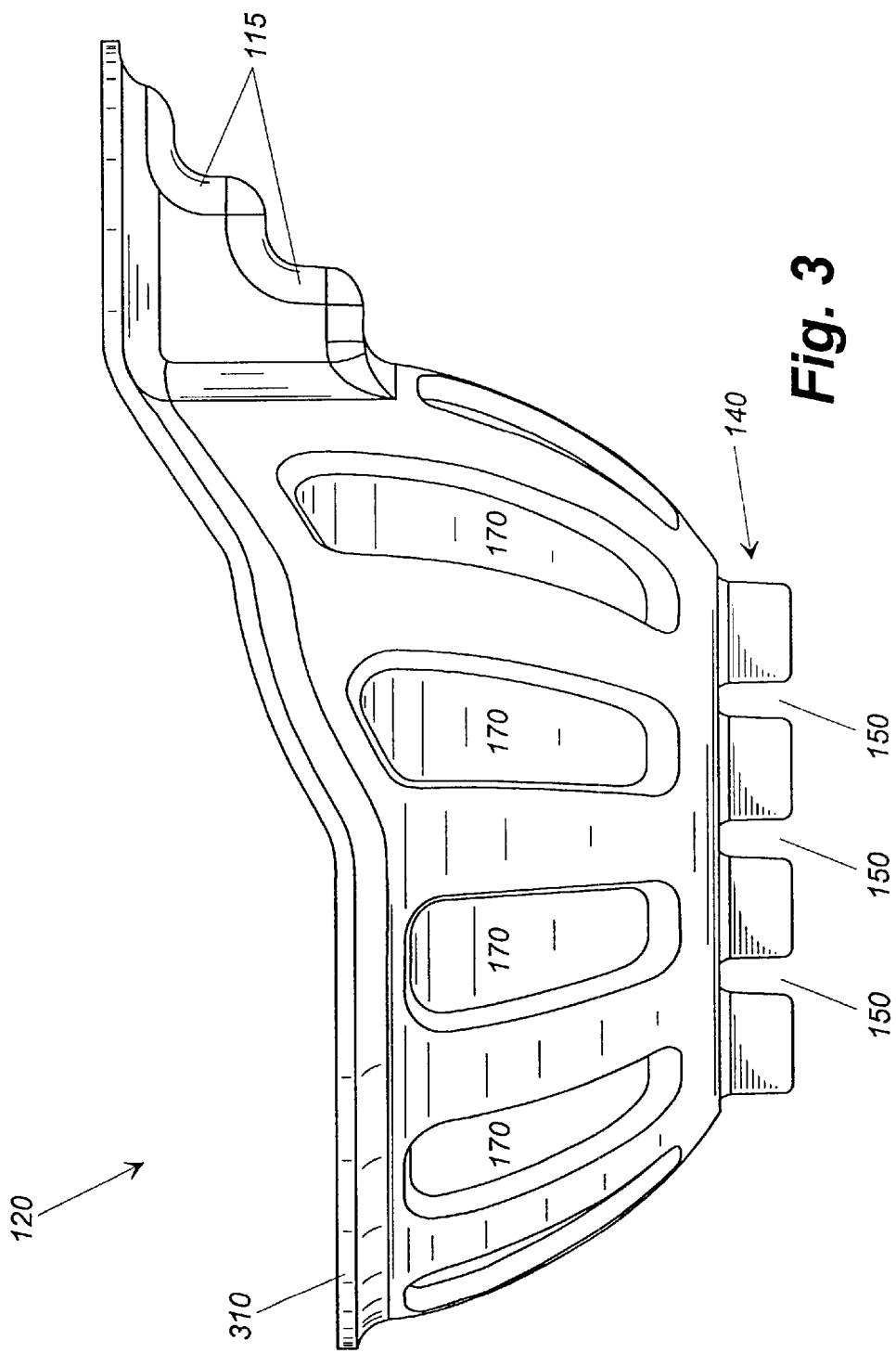
FIG. 3 is a side view of the outer wall of the hemispherical lower half of a tornado shelter in accordance with an exemplary embodiment of the present invention.
Figure 4:
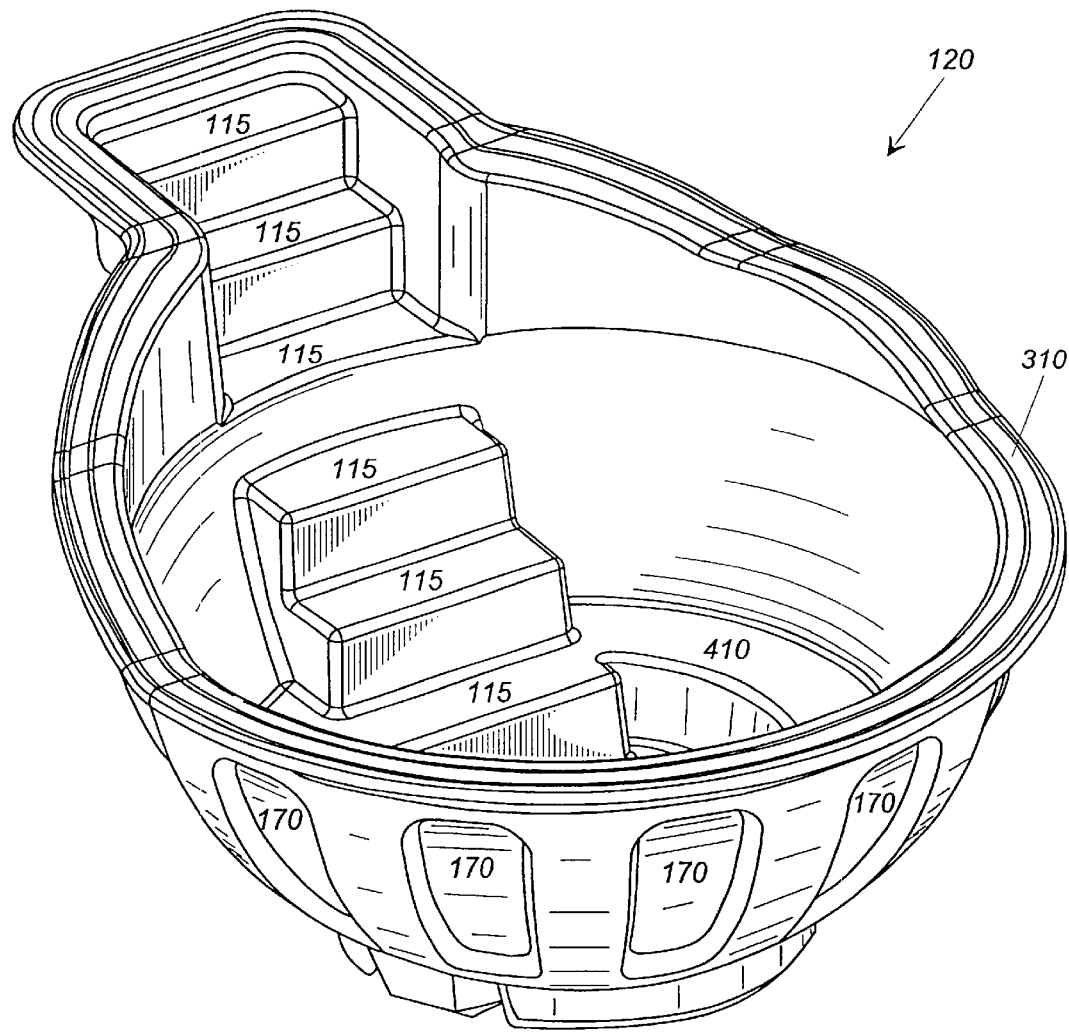
FIG. 4 is a perspective view of the inner wall of the lower half of a tornado shelter in accordance with an exemplary embodiment of the present invention.

FIGS. 1–7 illustrate the structure of an exemplary tornado shelter 100 in accordance with the present invention. FIG. 1 is a side view of the assembled tornado shelter 100. As shown in FIG. 1, the tornado shelter 100 comprises a dome-shaped upper half 110 and a hemispherical lower half 120. FIG. 2 is a perspective view of the outer wall of the upper half 110 of the tornado shelter 100. FIGS. 3–6 provide various views of the lower half 120 of the tornado shelter 100.

Preferably, both halves 110 and 120 of the tornado shelter 100 are molded to have a pattern of ribs 160 and indentations 170. The indentations 170 are illustrated in all of FIGS. 1–6. The ribs 160 are shown in FIGS. 1 and 2, but not in FIGS.

3–6. The ribs 160 and indentations 170 provide structural support for the tornado shelter 100. This structural support is specially adapted to counteract the forces that act on the tornado shelter 100 when the tornado shelter is buried in the ground. Alternative patterns (not shown) of ribs 160 and indentations 170 may provide equivalent structural support for the tornado shelter 100.

The tornado shelter 100 may have any number of ribs 160 from one on up. Preferably, the ribs 160 are equally spaced to have a reasonable distribution of stress. In a preferred embodiment, the ribs 160 are thirty degrees apart. If there is only one rib 160, the rib is preferably located opposite of the entrance 105. If there are only two ribs 160, they are preferably located 120 degrees away from entrance 105. An appropriate thickness for the ribs 160 is dependent upon the environment and is also driven by the molding process.

There are two general approaches to creating the indentations 170. In one approach, the mold used to make the shelter 100 is designed to impart the indentations 170 into the walls of the shelter during the molding process. In the second approach, the indentations 170 are created by first rotationally molding a tornado shelter 100 that does not have the indentations and then removing material from the walls of the tornado shelter to form the indentations. In this second approach, the tornado shelter 100 must initially be formed with walls thick enough to accommodate the removal of material to form the indentations 170.

Figure 12:
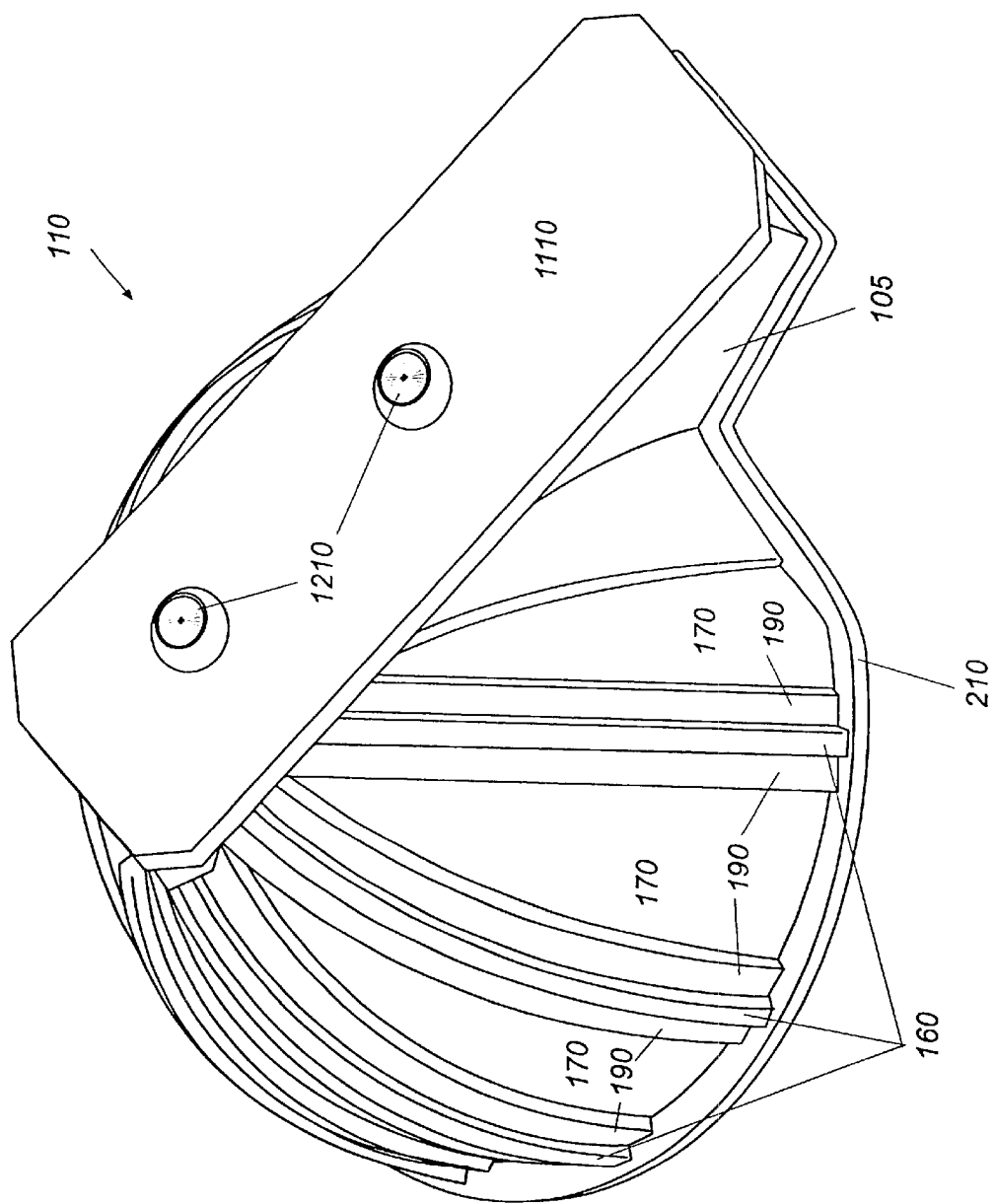
FIG. 12 is a perspective view of the outer wall and door of the dome-shaped upper half of a tornado shelter in accordance with an alternative exemplary embodiment of the present invention.
Figure 13:
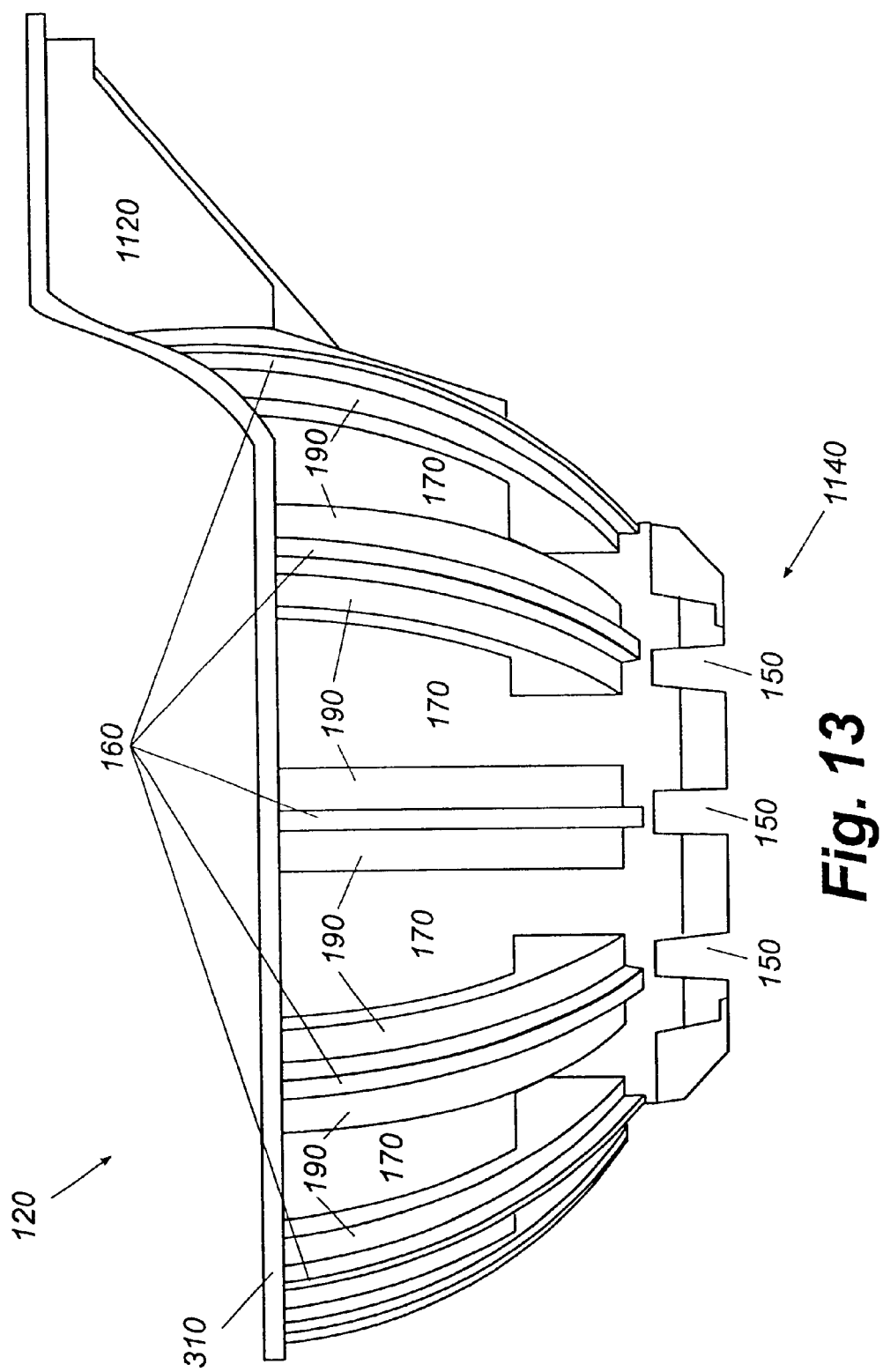
FIG. 13 is a side view of the outer wall of the hemispherical lower half of a tornado shelter in accordance with an alternative exemplary embodiment of the present invention.
Figure 14:
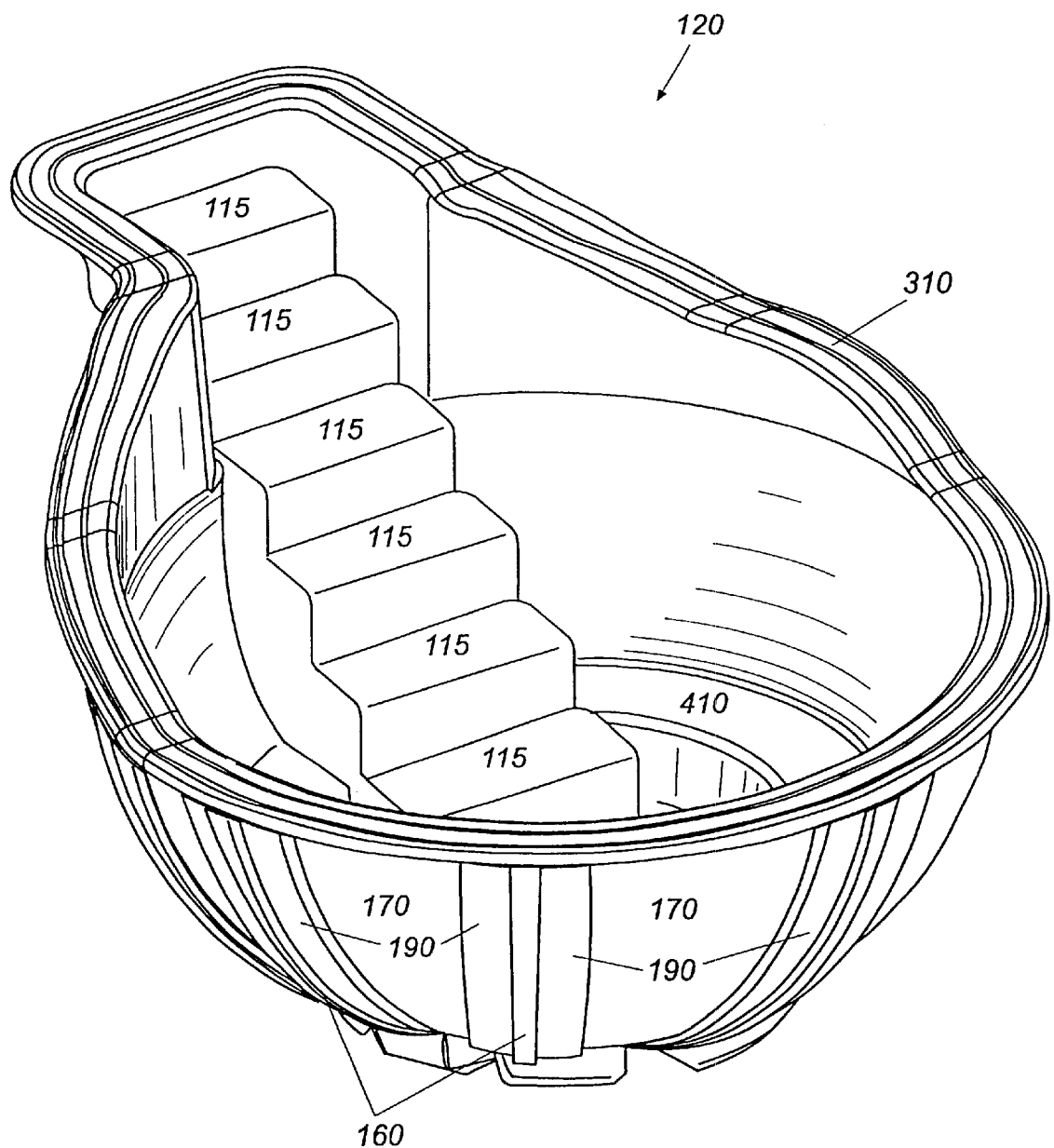
FIG. 14 is a perspective view of the inner wall of the lower half of a tornado shelter in accordance with an alternative exemplary embodiment of the present invention.
Figure 15:
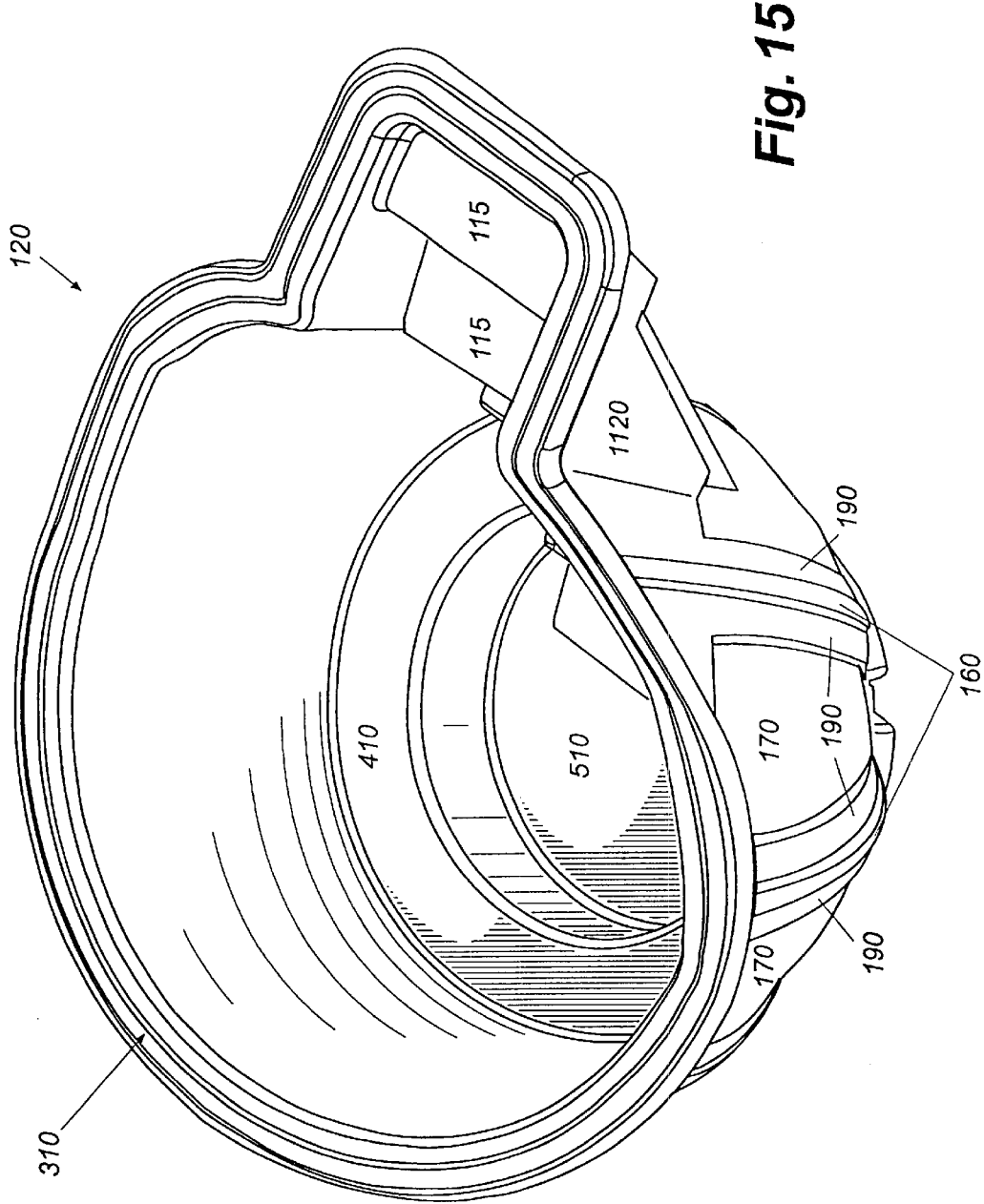
FIG. 15 is a perspective view of the inner wall of the lower half of a tornado shelter in accordance with an alternative exemplary embodiment of the present invention. The perspective view of this figure shows a different part of the inner wall of the lower half than FIG. 14 shows.

For the convenience of people using the tornado shelter 100, the manufacturer may provide the shelter with additional structural features. For instance, the upper half 110 of the tornado shelter 100 may be molded to define an entrance 105 (FIGS. 1 and 2) to the tornado shelter. A door, such as the door 1110 depicted in FIG. 12, covers the entrance 105 to the tornado shelter 100. The door 1110 may be a one-piece foam-filled unit rotationally molded from a moldable material.

The door 1110 may optionally include a layer of bulletproof material, such as KEVLAR, embedded in the insulation 1030 of the interior of the door. The cloth layer of KEVLAR can be formed in the door by inserting the KEVLAR into the door mold during the rotational molding process. The KEVLAR provides people inside the shelter 100 with extra protection against flying debris caused by a tornado. The KEVLAR also provides the people inside the shelter 100 with protection against a person outside the shelter firing a gun into the shelter through the door 1110, such as may occur during a riot following a devastating tornado.

The door 1110 preferably has ventilation units 1210 that enable the flow of fresh air between the inside of the tornado shelter 100 and the outside. Such ventilation units 1210 are well known to those skilled in the art.

The door 1110 is attached to the shelter 100 with one or more hinges that allow the door to open outward. Preferably, the door 1110 has a lock (not shown) to ensure that the door will remain shut should a tornado pass over the shelter 100. A three-point locking mechanism is used in a preferred embodiment. Preferably, a gasket material embedded into the door 1110 towards the edges provides a tight seal between the edges of the door 1110 and the portion of the top half 110 of the tornado shelter 100 defining the entrance 105

Likewise, the lower half 120 of the tornado shelter 100 may have steps 115 (FIGS. 1, 3, 4, 5, and 6) that enable a person entering the shelter through the entrance 105 to walk down into the interior of the shelter. Though not necessary, the steps 115 preferably have uniform risers and treads. Carpeting the interior of the shelter 100 is cheaper if the steps 115 are uniform because only one carpet size needs to be cut. Uniform steps 115 are also safer because people entering the shelter 100 will not be caught off guard by changing step sizes.

Figure 5:
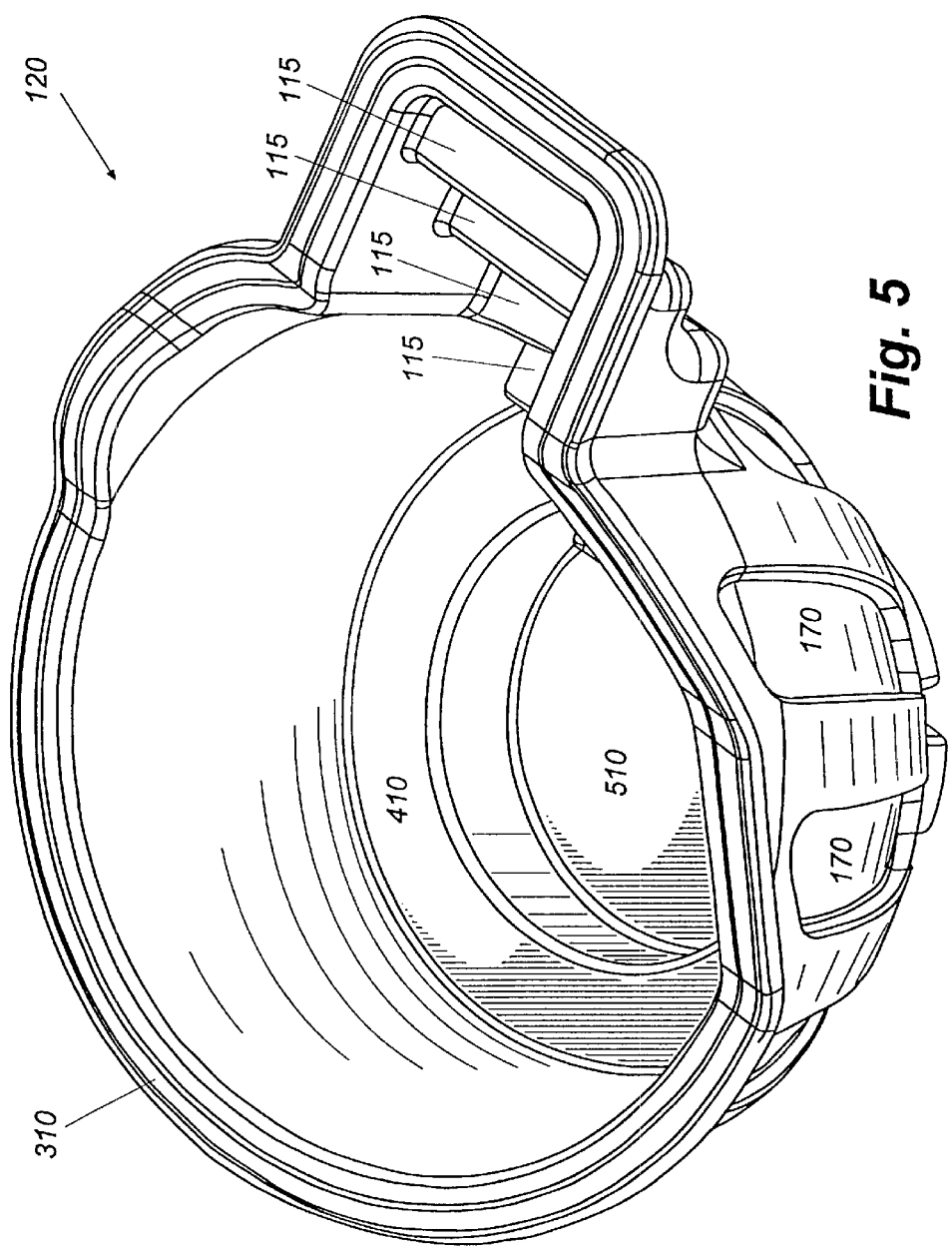
FIG. 5 is a perspective view of the inner wall of the lower half of a tornado shelter in accordance with an exemplary embodiment of the present invention. The perspective view of this figure shows a different part of the inner wall of the lower half than FIG. 4 shows.

The lower half 120 of the shelter 100 may also have a floor 510 (FIG. 5). Preferably, the lower half 120 has a circular seat 410 (FIGS. 4 and 5) surrounding the floor 510. Much of the rest of the inner wall of the lower half 120 of the shelter 100 serves as a backrest for people sitting on the seat 410. Preferably, the tornado shelter 100 is of sufficient size to comfortably seat six to eight people.

Figure 10:
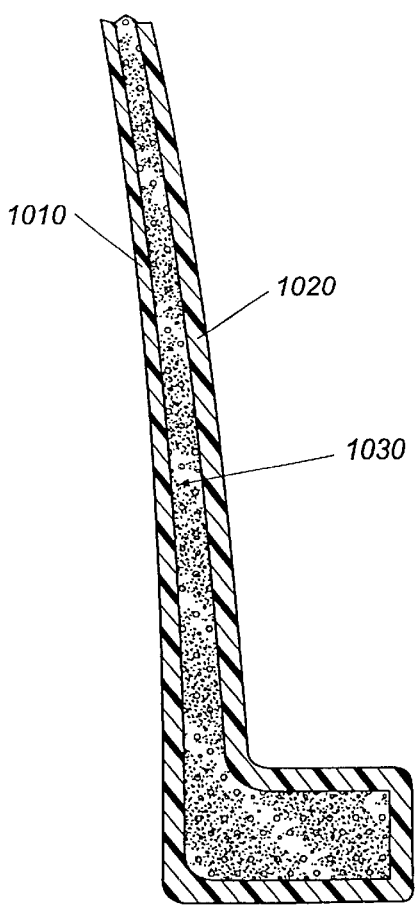
FIG. 10 is a cross-sectional view of a wall having a double-hull design.
Figure 11:
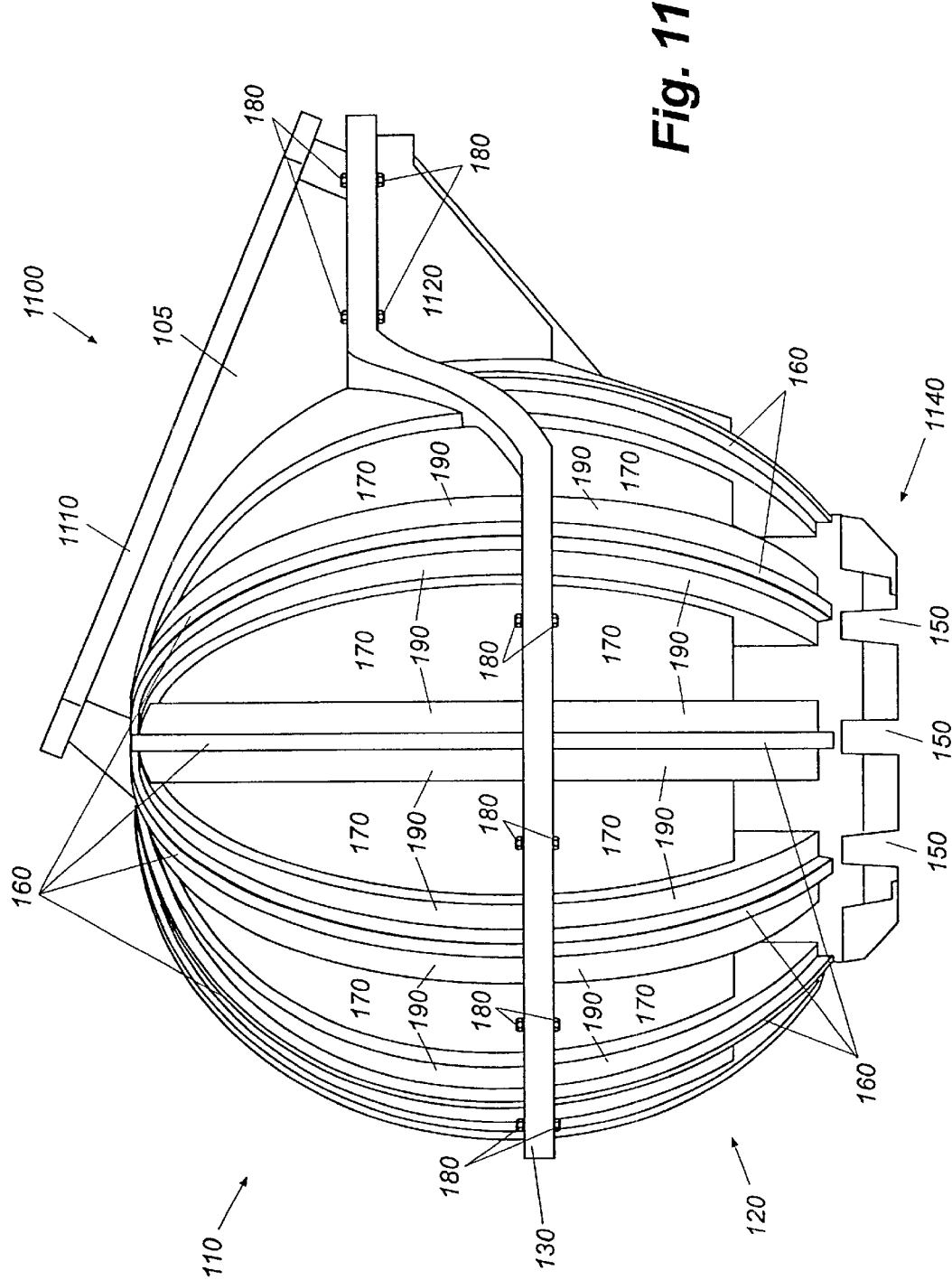
FIG. 11 is a side view of an assembled tornado shelter in accordance with an alternative exemplary embodiment of the present invention.

Each of the halves 110 and 120 of the tornado shelter 100 has a double-hull design. This double-hull design is best seen in FIG. 10, which is a cross-sectional view taken as indicated in FIG. 2 through the upper half 110 of the tornado shelter 100. Because of the double-hull design, the tornado shelter 100 has both an inner wall 1010 and an outer wall 1020 (FIG. 10). Although the inner wall 1010 and the outer wall 1020 in turn each have two surfaces, only one of these two surfaces is visible in the other figures.

The upper half 110 is formed from one mold, and the lower half 120 is formed from a different mold. The inner and outer walls of each of the halves 110 and 120 are formed during the rotational molding process by the adherence of plastic material to the inside of the walls of the molds used to form those halves. Accordingly, the inner and outer walls of a given half 110 or 120 comprise the same material. Due to the nature of rotational molding, the visible part of the inner and outer walls is smooth to the touch.

The tornado shelter 100 may also have a layer of insulation 1030 (FIG. 10) between the inner walls 1010 and the outer walls 1020 of each of the halves 110 and 120. This insulation 1030 may be formed in various ways during the rotational molding process in a manner known to those skilled in the art. In a typical tornado shelter 100, the insulation 1030 is made from the same material (e.g., polyethylene) as the rest of the shelter, but the insulation may be in foam form.

The tornado shelter 100 need not have the layer of insulation 1030. Instead, the walls of the tornado shelter 100 may be hollow or completely solid. Hollow wall interiors are easily created using rotational molding practices known to those skilled in the art.

If the walls of the tornado shelter 100 do have insulation 1030 between the inner walls 1010 and the outer walls 1020, there are two alternative ways to create that insulation using rotational molding practices known to those skilled in the art. One way to create the insulation 1030 is to add adequate material to the mold from the start and, through variations in heating, to create both the walls 1010 and 1020 as well as the insulation 1030 from the starting material.

Alternatively, the insulation 1030 may be created using a two-step process. In the first step, a manufacturer adds moldable material to the mold and produces the inner and outer walls 1010 and 1020 through rotational molding. In the second step, the manufacturer injects additional material into the interior space formed by the inner and outer walls 1010 and 1020 in order to create the foam insulation 1030.

The upper half 110 of the tornado shelter 100 has a flange 210 (FIG. 2). The lower half 120 of the tornado shelter 100 also has a flange 310 (FIGS. 3, 4, 5, and 6). Preferably, the flanges 210 and 310 mirror each other. In a completed tornado shelter 100, the two halves 110 and 120 are sealed along their respective flanges 210 and 310 to form the seam 130 (FIG. 1).

In order to attach the two halves 110 and 120 of the tornado shelter 100 together, the manufacturer first preferably ensures that the halves are properly aligned. To help the manufacturer align the halves 110 and 120, the molds used to form the two halves can be designed to impart to the shape of the two halves a means for aligning them. For instance, the molds may create sockets on the flange 310 for receiving bosses located on the flange 210. Similarly, the bosses may be located on the flange 310 while the sockets are located on the flange 210. Also, flange 210 could have both sockets and bosses, with each socket on flange 210 corresponding to a boss on flange 310 and each boss on flange 210 corresponding to a socket on flange 310.

Another means for aligning the upper half 110 with the lower half 120 is to have sockets on flange 210 that each correspond to a socket on flange 310. These sockets can also be imparted to the two halves 110 and 120 based upon the shape of the mold. The manufacturer may then insert pins into each of the sockets of flange 310 of the lower half 120. When the manufacturer lowers the upper half 110 onto the lower half 120 in the proper alignment, the free ends of the pins slide into the sockets of flange 210 of the upper half.

Another means for aligning the upper half 110 of the tornado shelter 100 with the lower half 120 involves corresponding holes on opposing flanges 210 and 310 of the shelter. The manufacturer places bolts 180 through these holes as an alignment mechanism, and these bolts also provide the advantage of adding additional security to the seal between two halves 110 and 120 of the shelter 100. To increase the alignment range, two alternative types of holes are especially useful: 1) oversized holes that are larger than the bolts, and 2) inverted, conical holes, where the wide ends of the conical holes face each other. The conical-type holes (wide ends facing each other) can more easily accommodate the draft requirements of the molding processes.

The upper half 110 may be attached to the lower half 120 with bolts. However, a preferred method for attaching the upper half 110 to the lower half 120 is to use a bonding material embedded with wire. The bonding material may be linear medium-density polyethylene or high-density polypropylene, though other materials capable of bonding to the material forming the upper and lower halves 110 and 120 would also work. An example of such a bonding material embedded with wire is POWERCORE.

To attach the two halves 110 and 120 in this way, the two halves of the tornado shelter are aligned and the bonding material embedded with wire is placed in solid form between the flanges 210 and 310. Then, the manufacturer attaches an electrical current generator to an exposed part of the wire. When electrical current is passed through the wire, the bonding material melts. After the current is turned off, the bonding material solidifies. By allowing the bonding material to solidify while in contact with both flanges 210 and 310, a strong and watertight seal is created between the two halves of the tornado shelter.

The bonding material embedded with wire may be applied in concentric rings. Applying the bonding material in this manner is also referred to as applying the material in multiple runs. Applying the bonding material embedded with wire in multiple runs creates a more redundant seal.

Should the seal between the two halves 110 and 120 ever leak, the leak is easily rectified. Specifically, one can again melt the bonding material by running current though the embedded wire. When the bonding material solidifies, the seal will once again be strong and watertight.

Other processes for creating a tight seal between the two halves 110 and 120 are also known to those skilled in the art. For instance, other chemical bonding agents such as glues and epoxies may be used to form the tight seals. The manufacturer can also create a tight seal by welding together the two halves 110 and 120 of the shelter 100.

In one embodiment of the present invention, the bolts 180 used to align the upper half 110 and the lower half 120 can be removed after the tight seal is formed through welding or using a chemical adhesive. As a shelter 100 according to this embodiment has no metal in it, such a shelter has the advantage of reducing the likelihood that lightning will strike the shelter.

Figure 6:
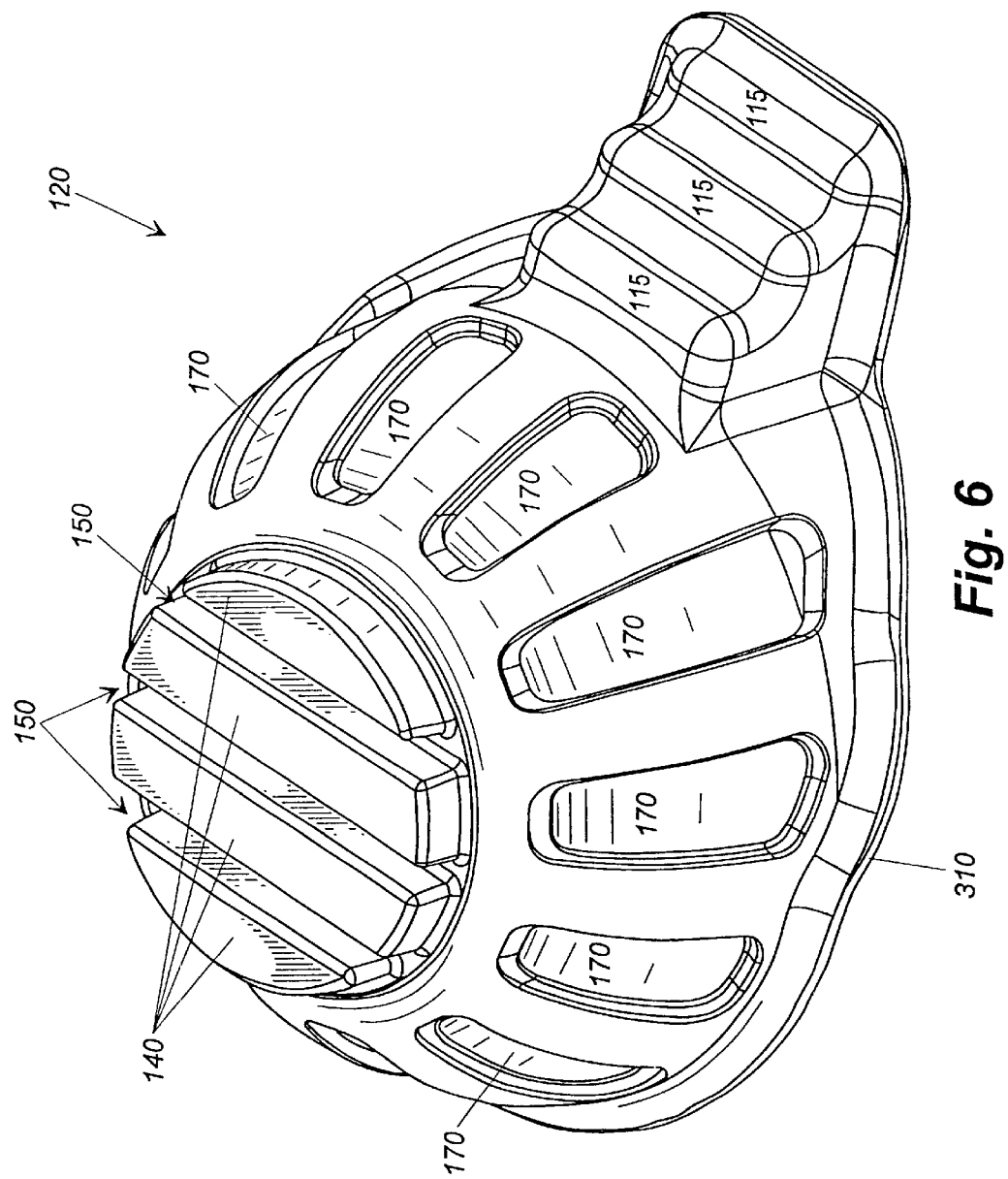
FIG. 6 is a perspective view of the outer wall of the lower half of a tornado shelter in accordance with an exemplary embodiment of the present invention.

Preferably, the bottom of the outer wall of the lower half 120 of the tornado shelter 100 has an anchoring system 140. The anchoring system 140 may be formed through the rotational molding process and thus be an integral feature of the lower half 120. A perspective view of the entire anchoring system 140 is best provided in FIG. 7. However, FIGS. 1, 3, and 6 also show the anchoring system 140. The anchoring system 140 shown in FIG. 6 is a different embodiment than the anchoring system shown in FIG. 7.

The anchoring system 140 has several pipe alignment grooves 150. These pipe alignment grooves are labeled 150a, 150b, and 150c in FIG. 7. Pipe alignment grooves 150 may also be seen in FIGS. 1, 3, and 6. Referring again to FIG. 7, the pipe alignment grooves 150a–c may comprise discrete groove sections 710a–l. Specifically, pipe alignment groove 150a comprises groove sections 710a–d, pipe alignment groove 150b comprises groove sections 710e–h, and pipe alignment groove 150c comprises groove sections 710i–l. Also, the anchoring system 140 may comprise several groove section units 720a–d, each having several groove sections 710 from different pipe alignment grooves 150. For instance, groove section unit 720a comprises groove sections 710a, 710e, and 710i; groove section unit 720b comprises groove sections 710b, 710f, and 710j; groove section unit 720c comprises groove sections 710c, 710g, and 710k; and groove section unit 720d comprises groove sections 710d, 710h, and 710l.

Figure 8:
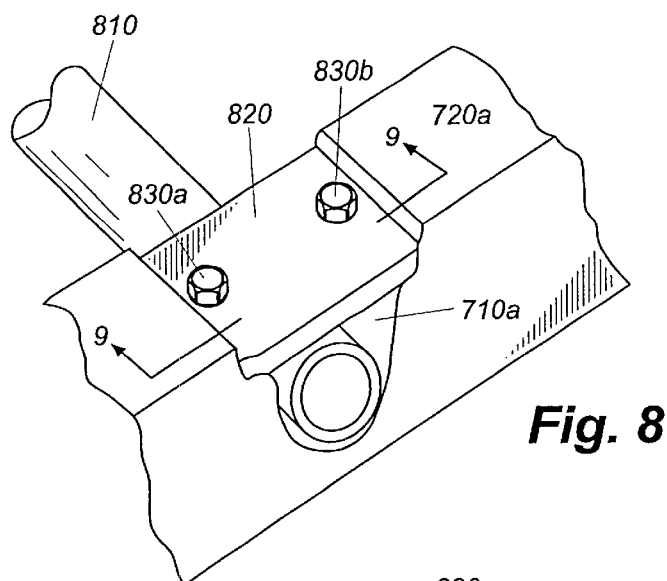
FIG. 8 is a perspective view of a groove section of a pipe alignment groove of the anchoring system as assembled into a finished tornado shelter in accordance with an exemplary embodiment of the present invention.
Figure 9:
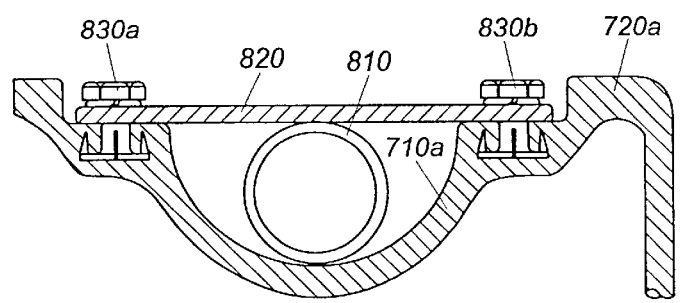
FIG. 9 is a cross-sectional view of the groove section shown in FIG. 8.

Before inserting the tornado shelter 100 into the ground, workers may insert a pipe into each pipe alignment groove 150. Preferably, both ends of the pipes extend beyond the length of the pipe alignment grooves 150 in which they have been placed. FIG. 8 illustrates how a pipe 810 is secured in the groove section 710a of the pipe alignment groove 150a in which the pipe has been inserted. Specifically, a worker positions a plate 820, preferably made of steel, so as to connect the edges of groove section 710a. The worker then connects the plate 820 to the groove section unit 720a with bolts 830a and 830b. The plate 820 and the groove section 710a together form a space in which the pipe 810 rests. Because the plate 820 is affixed to the groove section unit 720a and covers the pipe 810, the pipe remains secured in the pipe alignment groove 150a regardless of the orientation of the bottom half 120. FIG. 9 is a cross sectional view taken as shown in FIG. 8.

Instead of pipe alignment grooves 150, another embodiment (not shown) of the anchoring system comprises cylindrical spaces defined by the molding on the bottom of the tornado shelter 100. The pipes then lie in the cylindrical spaces such that the two ends of the pipes 810 extend beyond the anchoring system.

In both anchoring systems, the tornado shelter 100 may be anchored in the ground by placing slabs of material on top of the parts of the pipes 810 extending beyond the anchoring system 140 at the base of the lower half 120. When the tornado shelter 100 is buried, the surface areas of these slabs prevents the tornado shelter from rising in the ground. The slabs may comprise concrete. Because surface area is a more important factor than weight, the slabs may instead comprise the same material used to mold the rest of the tornado shelter or another moldable material. In fact, the slabs themselves may be molded using a rotational molding process. These slabs may have grooves that help the slabs to rest more securely on the pipes.

Features of an Alternative Tornado Shelter

FIGS. 11–16 depict an alternative exemplary tornado shelter 1100 that has advantages over the tornado shelter 100 depicted in FIGS. 1–7. However, many of the features of the tornado shelter 1100 depicted in FIGS. 11–16 are the same as the features of the tornado shelter 100 depicted in FIGS. 1–7, so the same reference numerals have been used to refer to like features.

The views of the tornado shelter 1100 depicted in FIGS. 11–16 correspond to the views of the tornado shelter 100 depicted in FIGS. 1–6. Specifically, the view of FIG. 11 corresponds to the view of FIG. 1, the view of FIG. 12 corresponds to the view of FIG. 2, the view of FIG. 13 corresponds to the view of FIG. 3, the view of FIG. 14 corresponds to the view of FIG. 4, the view of FIG. 15 corresponds to the view of FIG. 5, and the view of FIG. 16 corresponds to the view of FIG. 6.

Like the tornado shelter 100 depicted in FIGS. 1–6, the tornado shelter 1100 depicted in FIGS. 11–16 has a pattern of ribs 160 and indentations 170 relative to wall portions 190. However, the pattern of ribs 160 and indentations 170 of the tornado shelter 1100 is different from the pattern of ribs and indentations of the tornado shelter 100. The mold used to fabricate the tornado shelter 1100 of FIGS. 11–16 is preferably designed to impart the indentations 170 to the shelter during the molding process, rather than requiring the manufacturer to remove wall material after the molding process to create the indentations. The ribs 160 of the shelter 1100 are thirty degrees apart.

In a preferred embodiment, the ribs 160 of the shelter 1100 have a height of 2 inches relative to the wall portions 190, and the distance measured across a rib from adjacent wall portions 190 is 2⅜ inches. Likewise, the indentations 170 are 2 inches below the wall portions 190. The wall portions 190 are each 4 inches in width. The distance between wall portions 190 that are separated by an indentation 170 is 15 inches just above the flange 210 or just below the flange 310.

The tornado shelter 1100 depicted in FIGS. 11–16 has the entrance 105 shifted more toward the top than the shelter 100 depicted in FIGS. 1–7. This design difference has the effect of reducing the overall length of the shelter 1100 relative to the shelter 100.

The nose 1120 (FIGS. 11, 13, 15, and 16) of the shelter 1100 differs in shape from the corresponding portion of the shelter 100 depicted in FIGS. 1–7. Specifically, the nose 1120 of shelter 1100 has a more planar shape than the corresponding area of shelter 100, which corresponds to the steps on the inside of the shelter. This makes filling dirt into the space underneath the nose 1120 easier for the shelter 1100 than filling dirt into the corresponding space of the shelter 100. This, in turn, saves time, effort, and money.

Figure 7:
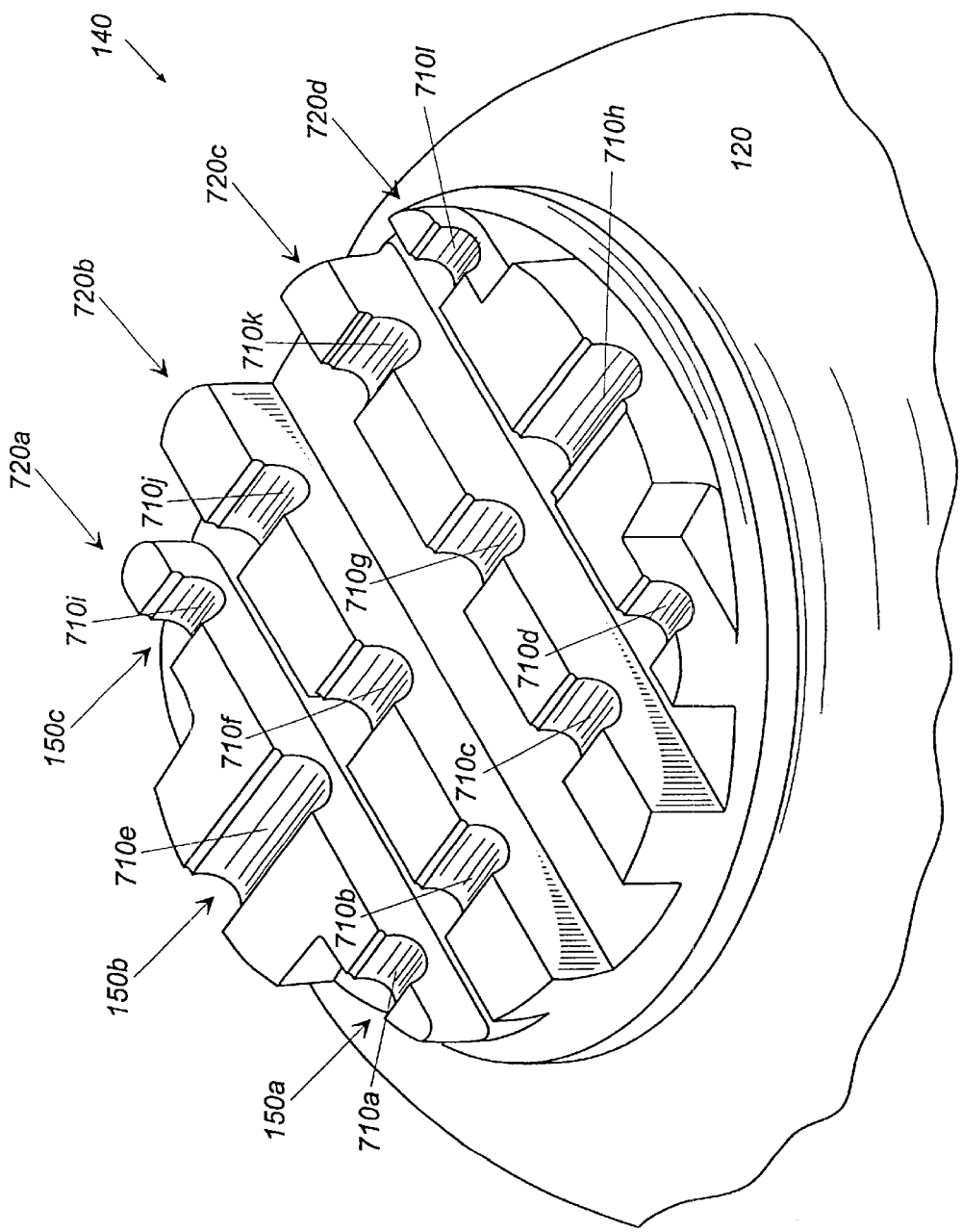
FIG. 7 is a perspective view of the anchoring system on the outer wall of the lower half of a tornado shelter in accordance with an exemplary embodiment of the present invention.
Figure 16:
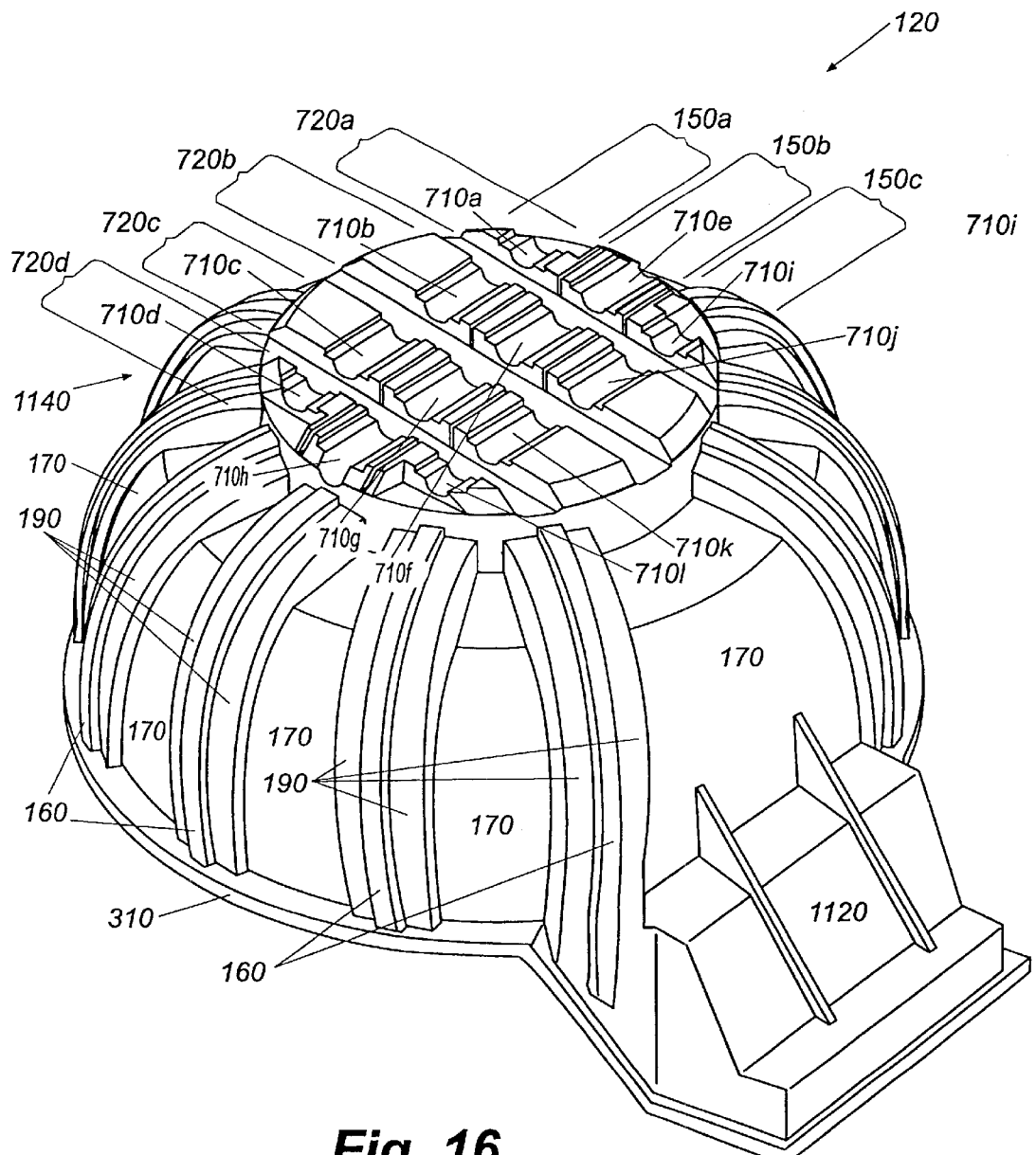
FIG. 16 is a perspective view of the outer wall of the lower half of a tornado shelter in accordance with an alternative exemplary embodiment of the present invention.

The anchoring system 1140 depicted in FIG. 16 also differs from the anchoring system 140 of FIG. 7. Specifically, the groove sections 710 of a given groove section unit 720 of the anchoring system 1140 of FIG. 16 are separated into discrete units. Nevertheless, the manufacturer can still provide adequate support to the anchoring system 1140 by using plates 820, each of which covers an entire pipe alignment groove 150 (including all of the groove sections comprising the pipe alignment groove), rather than having separate plates cover each of the groove sections comprising a pipe alignment groove. Plates 820 covering an entire pipe alignment groove 150 in the anchoring system 1140 are preferably fastened with t-nuts to the edges of each of the groove sections 710 comprising the pipe alignment groove.

Creating and Installing an Underground Tornado Shelter

Though various steps in an exemplary process for creating and installing an exemplary tornado shelter 100 have been described in conjunction with the foregoing description of the features of the tornado shelter, they are now explicitly summarized together. A manufacturer of the tornado shelter 100 creates a dome-shaped upper half 110 and hemispherical lower half 120 having the features already described. To create these two halves 110 and 120, the manufacturer uses a rotational molding process. Preferably, the material used in the rotational molding process is linear medium-density polyethylene, but the material may be any other material capable of being rotationally molded, including high-density polypropylene.

Then, the manufacturer aligns the upper half 110 with the lower half 120. A boss/socket or socket/pin/socket arrangement molded into the flanges 210 and 310 may help the manufacturer perform this alignment. Alternatively, the manufacturer may perform the alignment by placing bolts 180 through opposing holes on the two flanges 210 and 310; these holes may be oversized holes that are larger than the bolts or inverted, conical-shaped holes where the wide ends of opposing holes face each other. After aligning the upper half 110 of the shelter 100 with the lower half 120, the manufacturer forms a tight seal between the flange 210 of the upper half and the flange 310 of the lower half.

To form this seal, the manufacturer can use bolts or chemical bonding agents. Alternatively, the manufacturer can use a bonding material embedded with wire. When bonding material embedded with wire is used, the manufacturer can apply the material in multiple runs. When the manufacturer runs current through the wire, the bonding material melts. When the bonding material solidifies while in contact with both the flanges 210 and 310, a tight seam 130 is formed between the upper half 110 and lower half 120.

To prepare the tornado shelter 100 for burial, workers can place pipes 810 into the anchoring system 140. If the anchoring system 140 comprises pipe alignment grooves 150, then the workers can secure the pipes 810 in the pipe alignment grooves 150 by connecting the plates 820 to the anchoring unit 140 with bolts 830. If the anchoring system instead comprises molded-through holes (i.e., the base of the lower half 120 of the shelter 100 defines cylindrical spaces), then the workers insert the pipes 810 into the cylindrical spaces.

To install the tornado shelter 100, workers excavate the earth to form a hole. They then place the tornado shelter 100 in the hole. Because the pipes 810 extend beyond the base of the tornado shelter 100, the workers can anchor the shelter in the hole by placing slabs of material, such as concrete slabs or rotationally-molded slabs, on top of the pipes. Finally, the workers may bury the tornado shelter 100, perhaps with dirt, leaving only the entrance 105 exposed to the surface. The entrance 105 then provides a portal through which people can enter and exit the safety of the tornado shelter 100 when a tornado threatens.

Thus, an improved tornado shelter and a process for making and installing that tornado shelter have been described. Other alternative embodiments will become apparent to those skilled in the art to which an exemplary embodiment pertains without departing from its spirit and scope. Accordingly, the scope of the present invention is defined by the appended claims rather than the foregoing description.

The invention claimed is:

1. An underground tornado shelter, comprising:
   a dome-shaped upper half having a first flange;
   a hemispherical lower half having a second flange with a shape mirroring the first flange;
      the upper half and the lower half forming a spherical volume with a geometric center comprising:
         an inner wall;
         an outer wall, the outer wall further comprising a planar wall portion, a rib portion, and an indentation portion, the rib portion being spaced from the geometric center by a first radial distance, the planar wall portion being spaced from the geometric center by a second radial distance, and the indentation portion being spaced from the geometric center by a third distance, the first radial distance being greater than the second radial distance, the second radial distance being greater than the third radial distance; and
   means for connecting the first flange to the second flange.

2. The tornado shelter of claim 1, wherein the inner wall and the outer wall are shaped through a rotational molding process.

3. The tornado shelter of claim 1, wherein the upper half and the lower half each also include a layer of insulation located between the inner wall and the outer wall.

4. The tornado shelter of claim 3, wherein the layer of insulation is created during a rotational molding process.

5. The tornado shelter of claim 1, wherein the upper half includes an opening through which a person can enter the tornado shelter.

6. The tornado shelter of claim 5, wherein the lower half includes a plurality of steps that enable the person to walk down into the tornado shelter.

7. The tornado shelter of claim 6, wherein the lower half further includes a circular seat located on a floor inside the lower half.

8. The tornado shelter of claim 1, wherein the means for forming the seal between the first flange and the second flange comprises a chemical bonding agent.

9. The tornado shelter of claim 1, wherein the tornado shelter includes no metal so as to reduce the danger of being struck by lightning.

10. The tornado shelter of claim 1, wherein the means for forming the seal between the first flange and the second flange comprises bolts passing through the first and second flanges.

11. The tornado shelter of claim 1, wherein the means for forming the seal between the first flange and the second flange comprises a bonding material embedded with wire which operates by:
    being placed in solid form between the first flange and the second flange;
    melting in response to heat generated by running current through the wire; and bonding to both the first flange and the second flange upon solidification.

12. The tornado shelter of claim 1, wherein the lower half further comprises an anchoring system.

13. The tornado shelter of claim 12, wherein the anchoring system defines a cylindrical space for receiving a pipe.

14. The tornado shelter of claim 12, wherein the anchoring system comprises a plurality of pipe alignment grooves.

15. The tornado shelter of claim 14, further comprising:
    a plurality of pipes;
    a plurality of plates;
    each plate connecting edges of one of the pipe alignment grooves, whereby the plate and the pipe alignment groove whose edges the plate connects form a space within which one of the pipes rests;
    for each plate, a means for fastening the plate to the anchoring system so that the pipe resting in the space formed by the plate and the pipe alignment groove associated with the plate remains in the space; and
    each pipe having two ends extending beyond the anchoring system.

16. The tornado shelter of claim 15, wherein the means for fastening the plate to the anchoring system comprises at least one bolt.

17. The tornado shelter of claim 1, further comprising a means for aligning the upper half with the lower half of the tornado shelter.

18. The tornado shelter of claim 17, wherein the means for aligning the upper half with the lower half of the tornado shelter comprises:
    a plurality of bosses located on either the first flange or the second flange; and
    for each boss, a corresponding socket on the other flange for receiving the boss.

19. The tornado shelter of claim 17, wherein the means for aligning the upper half with the lower half of the tornado shelter comprises:
    a plurality of sockets on the first flange;
    for each socket of the plurality of sockets on the first flange, a corresponding socket on the second flange; and
    for each socket of the plurality of sockets on the first flange, a pin having a first end inserted into the socket on the first flange and a second end inserted into the corresponding socket on the second flange.

20. The tornado shelter of claim 17, wherein the means for aligning the upper half with the lower half of the tornado shelter comprises:
    a first plurality of holes defined by a shape of the first flange;
    a second plurality of corresponding holes defined by a shape of the second flange; and
    a bolt passing through one of the first plurality of holes on the first flange and the corresponding hole on the second flange.

21. The tornado shelter of claim 20, wherein the first plurality of holes and the second plurality of corresponding holes are conical-shaped, and wherein a wide part of the first plurality of holes face a wide part of the second plurality of corresponding holes.

22. The tornado shelter of claim 1, further comprising a door.

23. The tornado shelter of claim 22, wherein the door comprises a layer of bullet-proof material.

24. The tornado shelter of claim 22, wherein the door includes a gasket material to create a tight seal between the door and the upper half.

25. The tornado shelter of claim 24, wherein a hinge attaches the door to the upper half, and a multi-point locking mechanism secures the door in a closed position.

26. A process for creating an underground tornado shelter, comprising:
- rotationally molding a dome-shaped upper half that includes:
  - a first flange; and
  - a first double-hull having a first inner wall and a first outer wall; rotationally molding a hemispherical lower half that includes:
  - a second flange;
  - a second double-hull having a second inner wall and a second outer wall; and
  - an anchoring system comprising a plurality of pipe alignment grooves; and
- forming a seal between the first flange and the second flange.

27. The process of claim 26, wherein the first double hull further includes a first layer of insulation between the first inner wall and the first outer wall, and the second double hull further includes a second layer of insulation between the second inner wall and the second outer wall.

28. The process of claim 26, wherein the lower half is rotationally molded to further include:
- a plurality of steps that enable the person to walk down into the tornado shelter; and
- a circular seat located on a floor inside the lower half.

29. The process of claim 26, wherein the upper half and the lower half are rotationally molded to include in the first outer wall and the second outer wall a pattern of ribs and indentations that reinforces the tornado shelter.

30. The process of claim 26, wherein rotationally molding the upper half comprises placing polyethylene in a first mold, and rotationally molding the lower half comprises placing polyethylene in a second mold.

31. The process of claim 26, wherein forming the seal between the first flange and the second flange further comprises:
- aligning the upper half with the lower half;
- placing a bonding material embedded with wire between the first flange and the second flange;
- melting the bonding material by running current through the wire; and
- allowing the bonding material to solidify while in contact with both the first flange and the second flange.

32. An underground tornado shelter, comprising:
- a dome-shaped upper half having a first flange;
- a hemispherical lower half having a second flange with a shape mirroring the first flange; the upper half and lower half further comprising;
  - an inner wall,
  - an outer wall, the outer wall further comprising a planar wall portion, a rib portion, and an indentation portion; the rib portion comprising a convex shape relative to an exterior side of the planar wall portion; the indentation portion comprising a concave shape relative to the exterior side of the planar wall portion; and
- means for connecting the first flange to the second flange.

33. The tornado shelter of claim 32, wherein each indentation portion comprises a polygonal shaped region disposed circumscribed by rib portions.

34. The tornado shelter of claim 32, wherein each rib portion extends along the planar wall portion in a longitudinal direction relative to a respective half.

* * * * *